(12) United States Patent
Chen et al.

(10) Patent No.: US 7,220,041 B2
(45) Date of Patent: May 22, 2007

(54) PLANAR LIGHT SOURCE DEVICE

(75) Inventors: Yi-Ming Chen, Hsin-Chu (TW);
Chou-Chih Yin, Hsin-Chu (TW);
Jun-Chung Chen, Hsin-Chu (TW);
Chia-Liang Hsu, Hsin-Chu (TW);
Chia-Fen Tsai, Hsin-Chu (TW);
Min-Hsun Hsieh, Hsin-Chu (TW)

(73) Assignee: Epistar Corporation, Hsinchu (TW)

( * ) Notice: Subject to any disclaimer, the term of this patent is extended or adjusted under 35 U.S.C. 154(b) by 43 days.

(21) Appl. No.: 10/908,401

(22) Filed: May 10, 2005

(65) Prior Publication Data
US 2005/0276068 A1 Dec. 15, 2005

(30) Foreign Application Priority Data
May 28, 2004 (TW) ................ 93115437 A

(51) Int. Cl.
*F21V 7/04* (2006.01)

(52) U.S. Cl. ...................... 362/613; 362/601; 362/609; 362/612; 362/623

(58) Field of Classification Search ......... 362/600–634
See application file for complete search history.

(56) References Cited

U.S. PATENT DOCUMENTS 5,921,652 A * 7/1999 Parker et al. ................ 362/601
2004/0246697 A1 * 12/2004 Yamashita et al. ............ 362/31

* cited by examiner

*Primary Examiner*—Sandra O'Shea
*Assistant Examiner*—James W Cranson, Jr.
(74) *Attorney, Agent, or Firm*—Winston Hsu

(57) ABSTRACT

Disclosed is a planar light source device comprising a light generation device comprising at least two light-emitting elements; a light-mixing device for mixing a generated light from the light generation device to generate a mixed linear light; and a planar light generation device comprising a light-scattering portion for receiving the mixed light to generate a planar light.

26 Claims, 7 Drawing Sheets

PLANAR LIGHT SOURCE DEVICE

BACKGROUND OF INVENTION

1. Field of the Invention

The present invention relates to a planar light source device.

2. Description of the Prior Art

Liquid crystal displays (LCD) or other flat display devices are non-self-illumination displays, wherein backlight modules are included for generating area light. The backlight modules can be categorized into two types: a top view type and a side view type. A prior art top view type backlight module of an LCD includes cold cathode fluorescent lamps (CCFL), a diffuser, a prism sheet, etc. In order to uniformly distribute light for providing a proper planar light source for the LCD, distances between light sources and between light sources, the diffuser, and the prism sheet have to be controlled precisely to avoid the problem of non-uniform illumination. Besides the components of the above mentioned top view backlight module, a prior art side view backlight module of an LCD further includes a light guide plate for spreading light. However, it still cannot solve the problem of non-uniform illumination. Furthermore, the backlight modules of the two types are complicated and cause the problems of high manufacturing costs and complex assembly.

In order to overcome the above-mentioned problems, a side view light-emitting diode disclosed in TW Patent Publication No. 541726 includes a light-emitting diode package and a lens. The lens guides the light emitted from the LED package to become a planar side view light before the light guide plate guides the light. However, the side view light-emitting diode is still so complicated that the manufacture cost is still a problem.

A backlight module disclosed in TW Patent Publication No. 575722 includes a plurality of linear light sources (such as tubes), or a plurality of point light sources (such as light-emitting diodes), a light guide plate, and optical multiplayer films (such as diffusers and prism sheets). The light guide includes a plurality of grooves at the bottom thereof for accommodating the tubes and a plurality of cuts at the top thereof corresponding to the grooves for diffusing the light emitted from the tubes through the light guide plate by means of total internal reflection. However, the above mentioned backlight module can be utilized only for a monochromatic light source. If the white light for the backlight source is formed by mixing point light sources of different colors (e.g. red, green, and blue light-emitting diodes), the backlight source of the backlight module causes the problem of the non-uniform color mixing or a partially converging problem. Besides, the manufacture cost and the difficulty in assembly is still a problem.

SUMMARY OF INVENTION

It is therefore an object of the invention to provide a planar light source device.

According to this invention, the planar light source device comprises a light generation device including at least two light-emitting elements for generating different light colors; a light-mixing device for mixing light from the light generation device to generate a mixed linear light; and a planar light generation device comprising a light-scattering portion for receiving the mixed light and generating a planar light.

These and other objectives of the present invention will no doubt become obvious to those of ordinary skill in the art after reading the following detailed description of the preferred embodiment that is illustrated in the various figures and drawings.

DETAILED DESCRIPTION

EMBODIMENT 1

Figure 1:
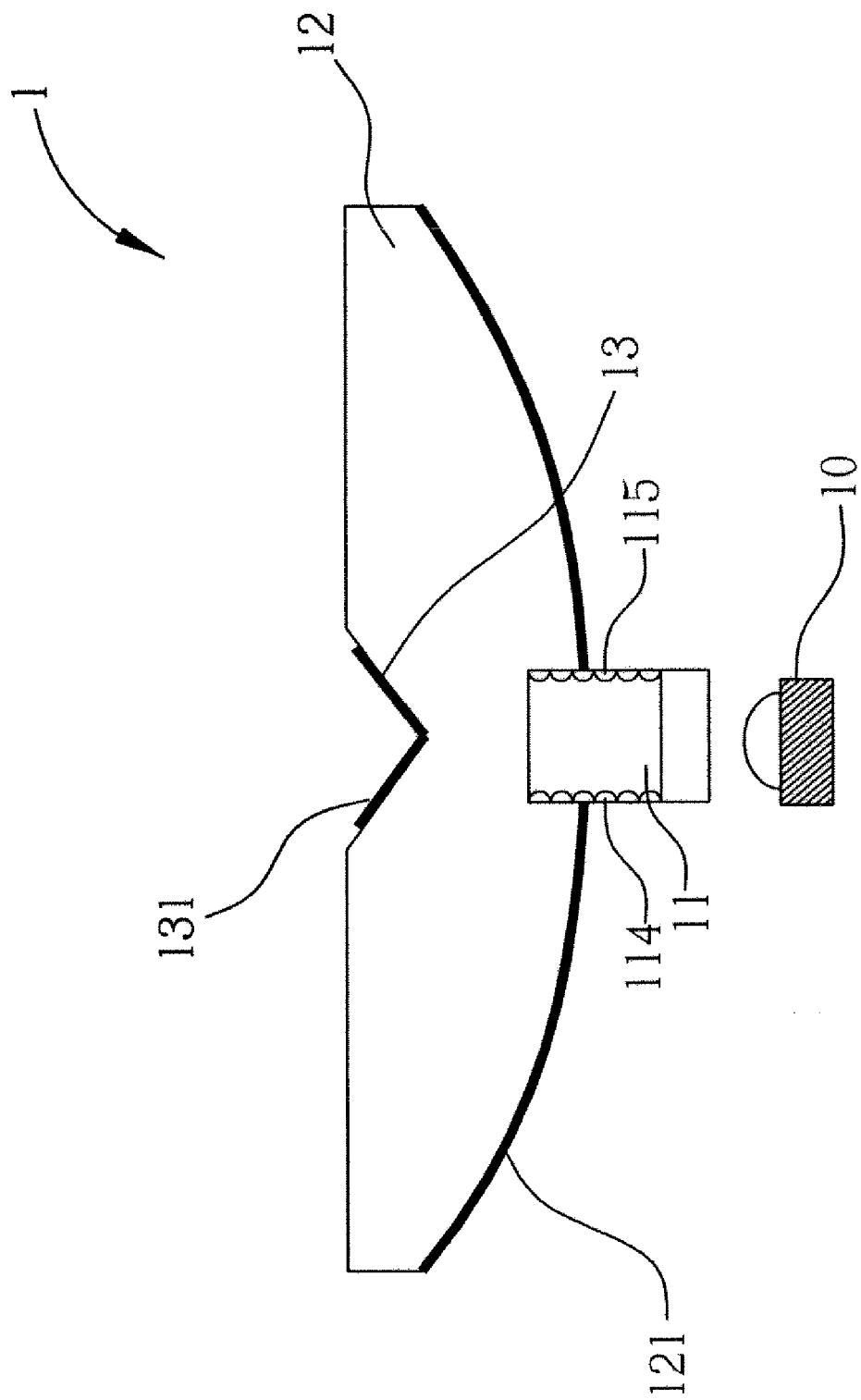
FIG. 1 illustrates a preferred embodiment of a planar light source device in accordance with the present invention.

Referring to FIG. 1, the planar light source device 1 comprises a light generation device 10 having light-emitting elements capable of emitting red light, green light, and blue light; a light-mixing device 11 for mixing generated light from the light generation device 10 to generate a mixed linear light; and a planar light generation device 12, wherein the bottom portion of the planar light generation device 12 defines a -arc surface and comprises a reflection layer 121 in the bottom thereof for reflecting light emitted to the bottom so as to increase the light-mixing efficiency. The planar light source device 12 also comprises a light-scattering portion 13 on the top thereof for receiving the mixed linear light to generate a planar light. The light-scattering portion 13 can be a groove. The shape of the groove is selected from a profile group consisting of V-shape, U-shape, wavy-shape, and other substitute shapes. In FIG. 1, the shape of the light-scattering portion 13 is a V-shaped groove. As the light from the light-mixing device 11 impinges upon the light-scattering portion 13, the light will achieve total internal reflection (TIR) in a specific angle because the material on the other side of the groove is a relatively sparse medium (such as the air). For example, as the groove is the V shape and the angle is $\theta$, and the critical angle of the light-mixing device 11 is $\theta c$, the light will achieve the total internal reflection (TIR) when $\theta < 2 \times (90 - \theta c)$. Similarly, the light can achieve TIR in a specific angle both in the U-shape and wavy-shape grooves. In addition, a reflection layer 131 can be formed on the V-shaped groove to enhance light-scattering efficiency. Lateral sides of the light-mixing device 11 have printed distribution patterns 114, 115 and light can be reflected and/or refracted by the printed distribution patterns 114, 115 to improve the light mixing.

Figure 2:
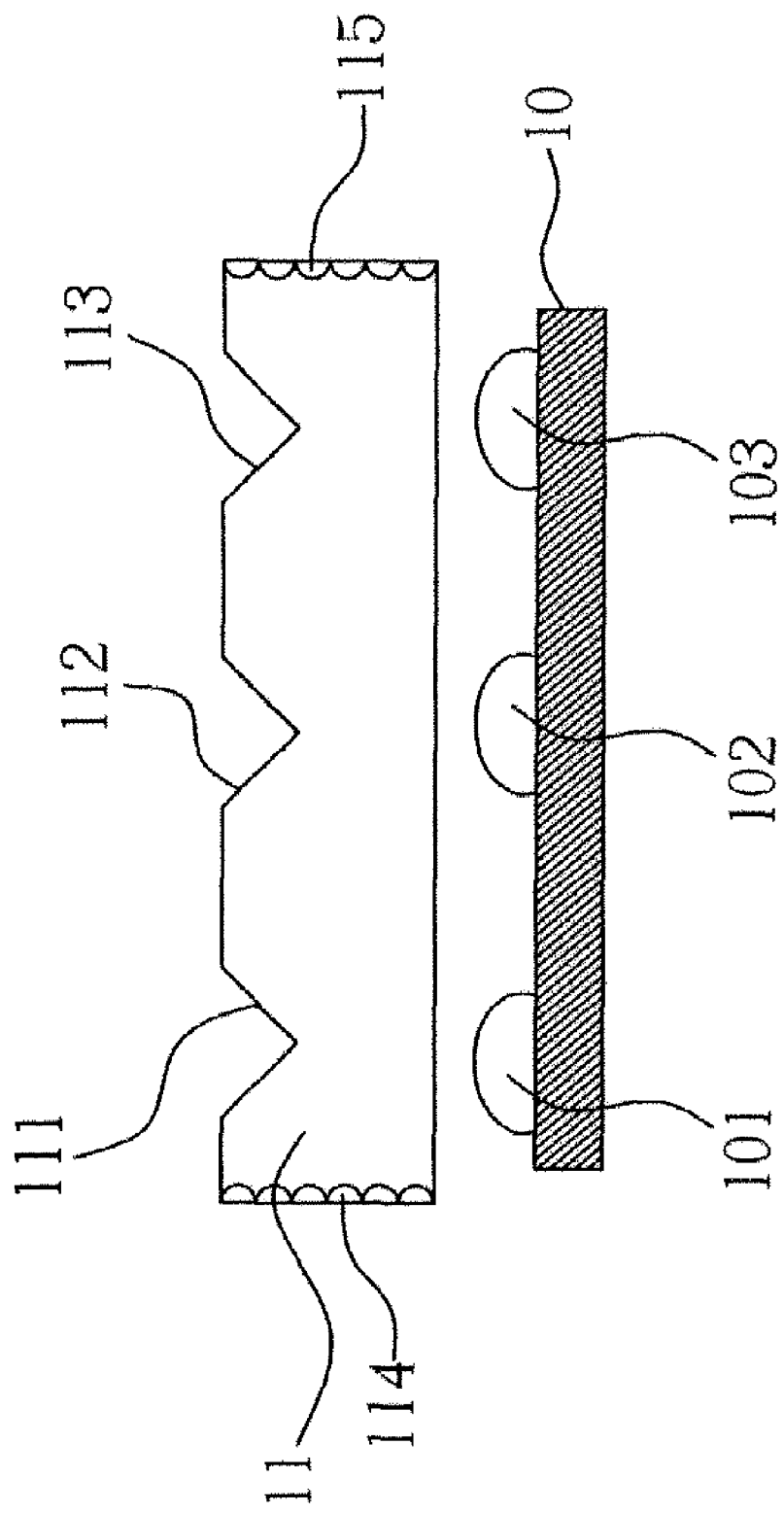
FIG. 2 is a cross-section view illustrating the light source device and the light-mixing device of the planar light source as shown in FIG. 1.
Figure 3:
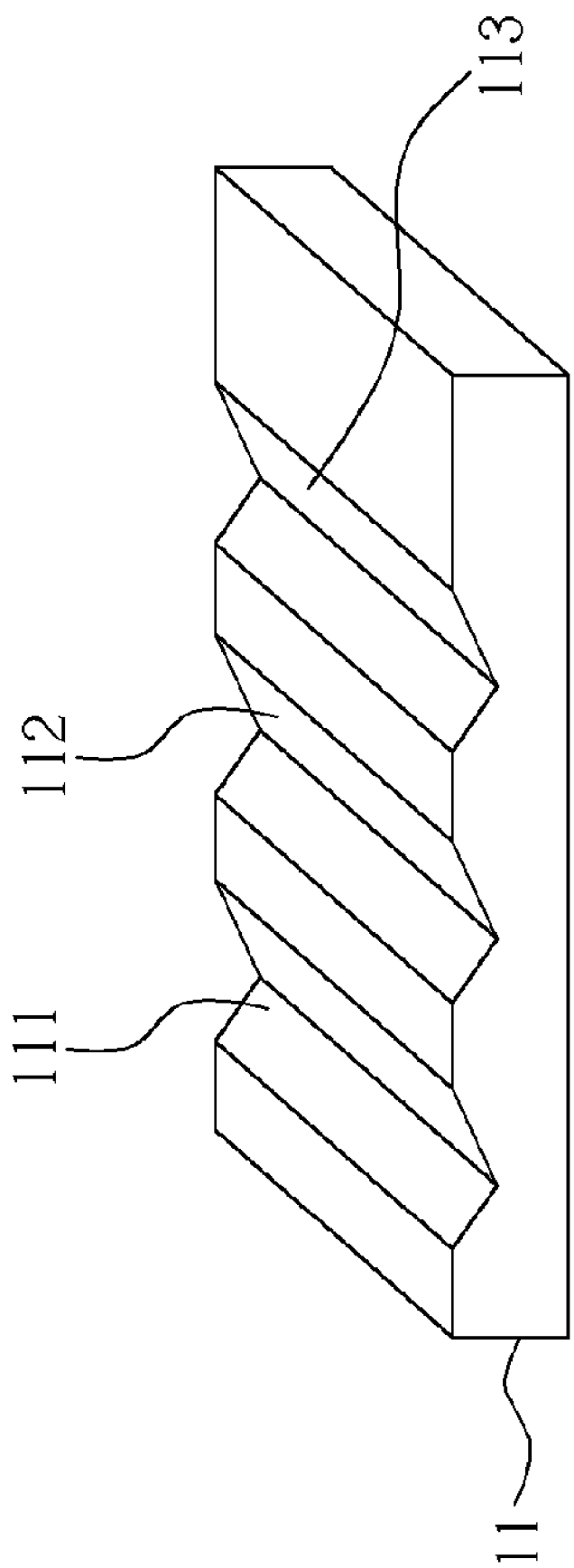
FIG. 3 is a schematic diagram illustrating of the light-mixing device as shown in FIG. 1.

Referring to FIG. 2, the light generation device 10 comprises light-emitting elements 101, 102, and 103. The light-mixing device 11 includes light-scattering portions 111, 112, and 113, where the amount of the light-scattering portions is equal to that of the light-emitting elements. Referring to FIG. 3, the light-scattering portions 111, 112, and 113 are V-shaped grooves, which can also be of a shape selected from a group consisting of the U-shape, the wavy-shape, and other substitute shapes. Similar to a principle of above-mentioned light-scattering portion 13, as the light from the light generation device 10 impinges upon the light-scattering portions 111, 112, and 113, the light can pass through the light-scattering portions to diffuse to the two sides of the light-mixing device 11. Hence, the -light from each light generation device can be mixed to achieve the light-mixing purpose. The V-shaped grooves of the light-scattering portions 111, 112, 113 and the V-shaped groove of the light-scattering portion 13 are arranged so as to be non-parallel to one another, and the preferred arrangement is featured in that the V-shaped grooves of the light-scattering portions 111, 112, 113 are orthogonal to the V-shaped groove of the light-scattering portion 13 so as to generate uniform planar light from the planar light generation device 12.

EMBODIMENT 2

Figure 4:
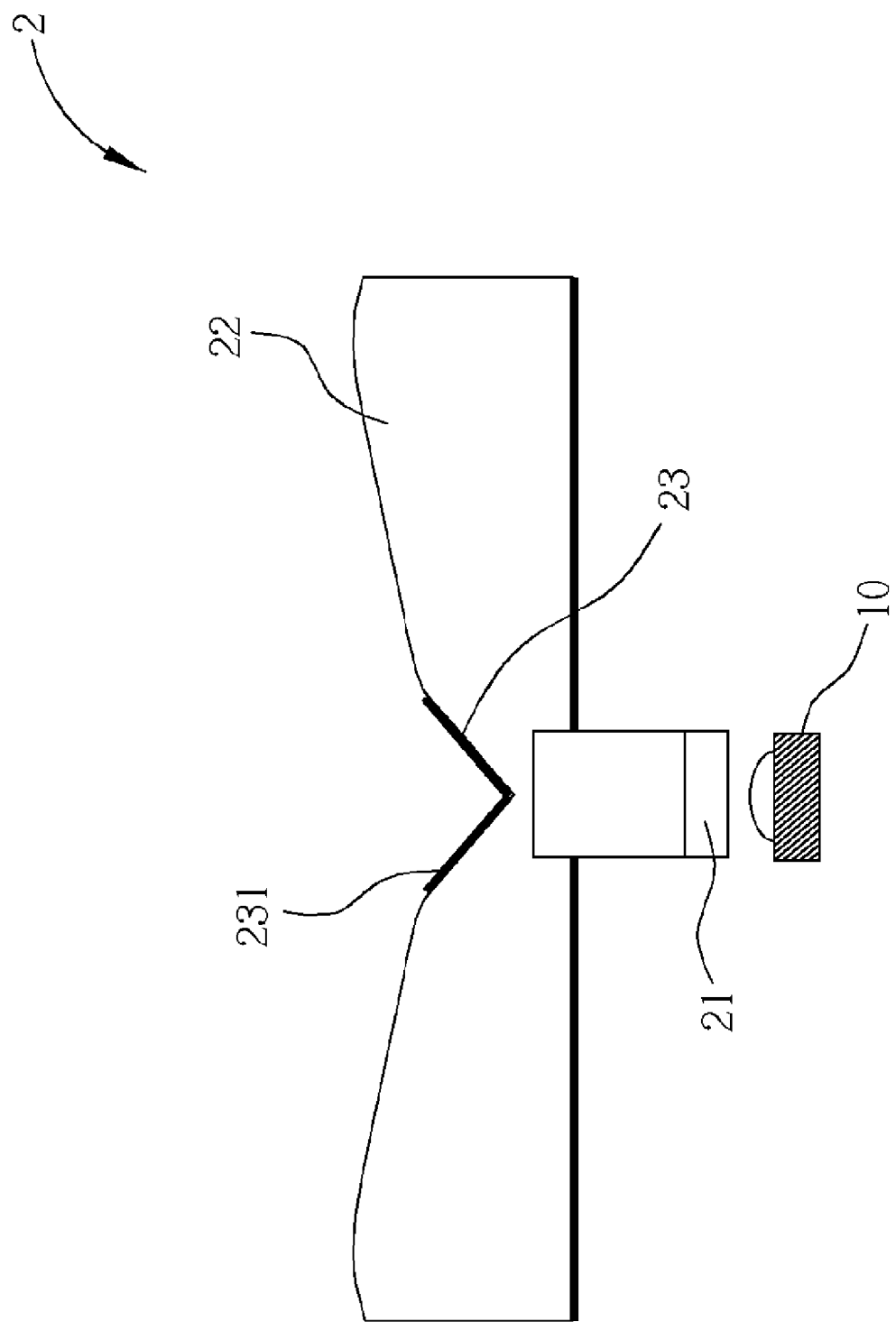
FIG. 4 illustrates a preferred embodiment of a planar light source device in accordance with the present invention.

Referring to FIG. 4, the planar light source device 2 comprises a light generation device 10; a light-mixing device 21 for mixing the light from the light generation device 10 to generate a mixed linear light; and a planar light generation device 22. The top portion of the planar light generation device 22 is composed of two inclined planes (tilting from the outside to the inside) and a light-scattering portion 23 for receiving the mixed linear light to generate a planar light. In addition, the planar light generation device 22 comprises a reflection layer in the bottom portion thereof for reflecting the light back to the planar light generation device 22 so as to improve the light-mixing efficiency. The light-scattering portion 23 can be in the form of a groove. The shape of the groove can be selected from a group consisting of V-shape, U-shape, wavy-shape, and other substitute shape. In FIG. 4, the shape of the light-scattering portion 23 is a V-shaped groove. Additionally, a reflection layer 231 can be formed on the V-shaped groove to enhance the light-scattering efficiency.

Figure 5:
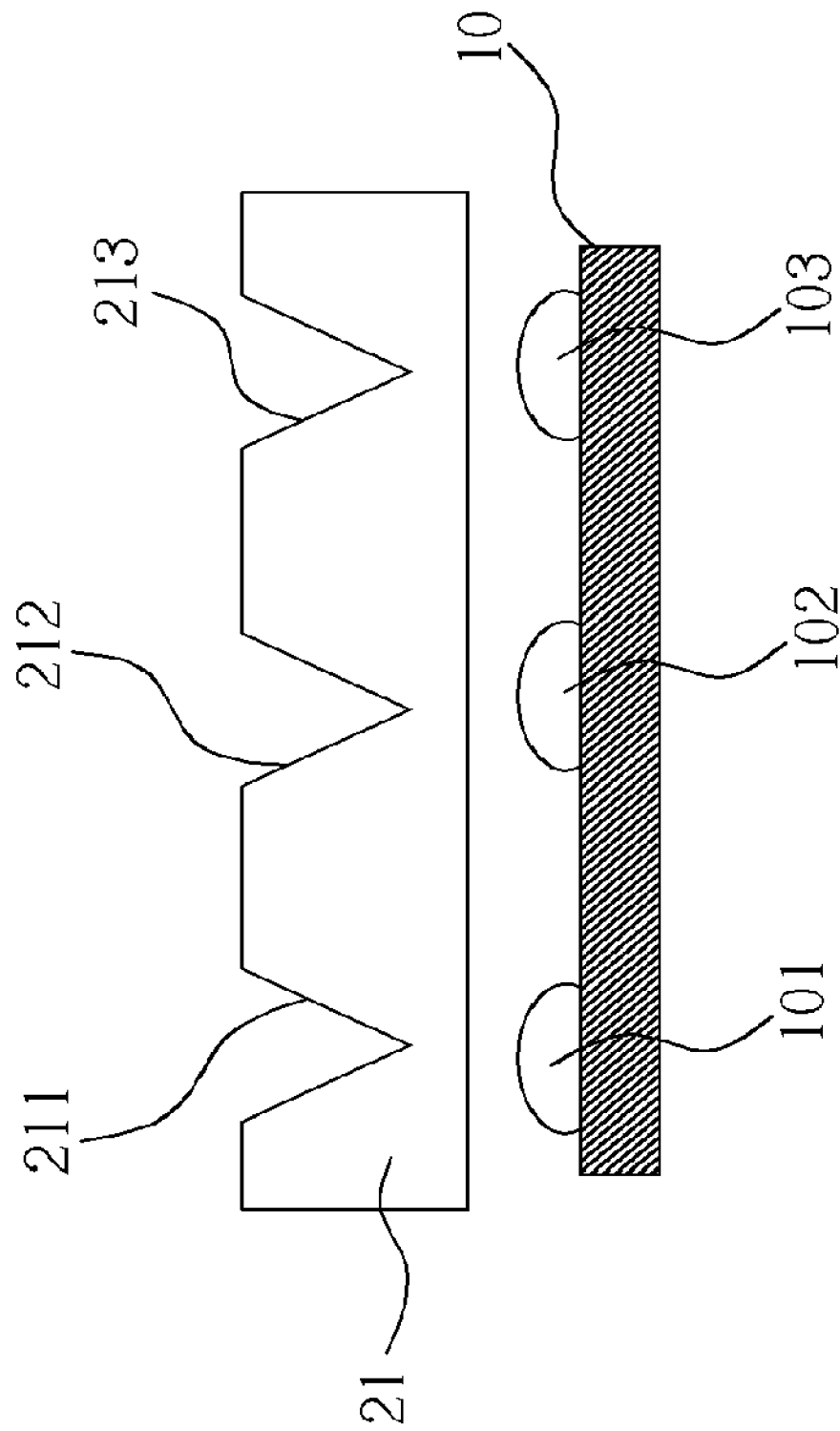
FIG. 5 is a cross-section view illustrating the light source device and the light-mixing device as shown in FIG. 4.

Referring to FIG. 5, the light-mixing device 21 comprises light-scattering portions 211, 212, and 213, wherein each of these light-scattering portions is in the shape of a cone. The amount of the light-scattering portions is equal to that of the light generation devices. As the light from the light generation device 10 impinges upon the light-scattering portions, the light can pass through the light-scattering portions to diffuse to the two sides of the light-mixing device 21. Hence, the -light from each light generation device can be mixed to achieve the light-mixing purpose.

EMBODIMENT 3

Figure 6:
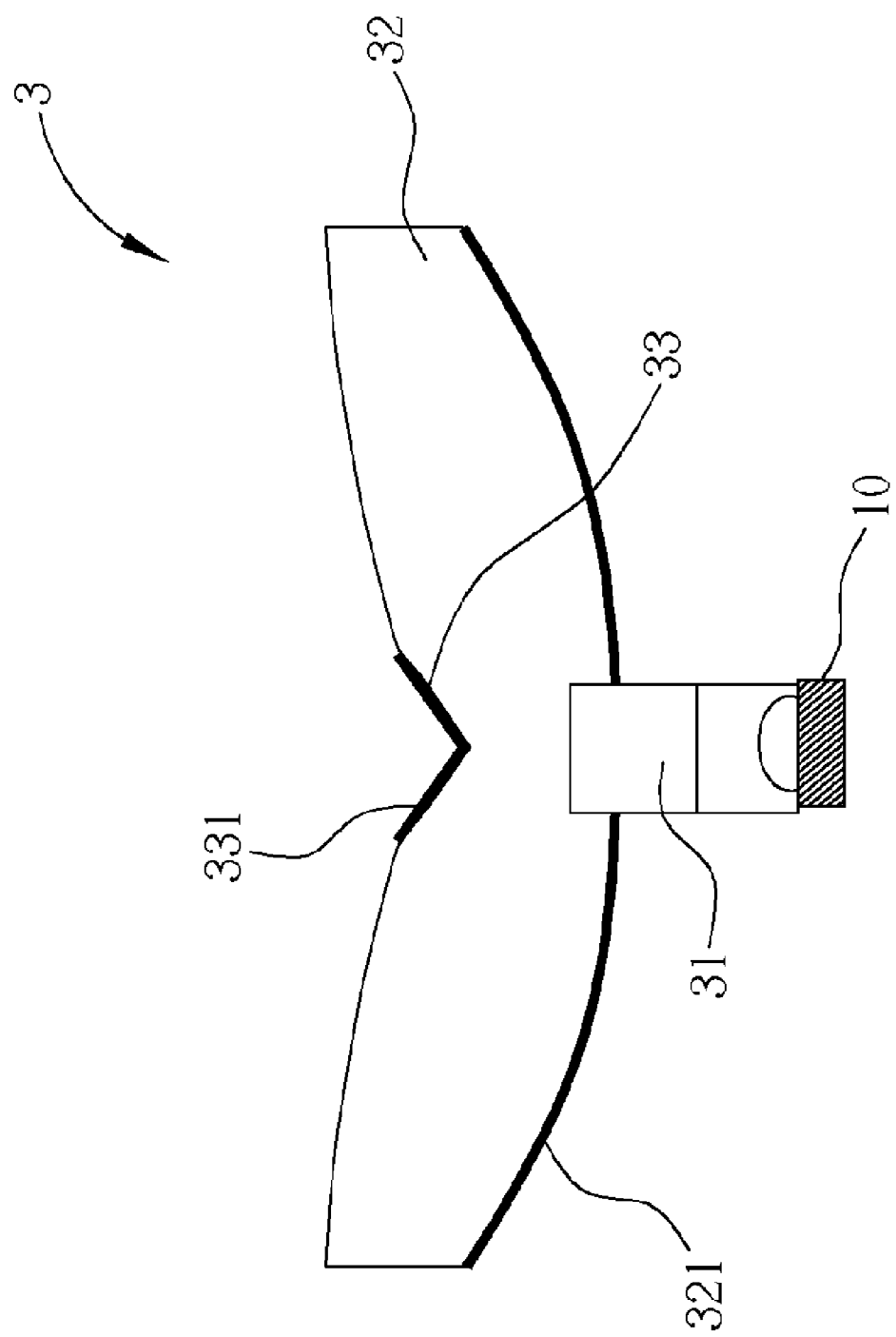
FIG. 6 illustrates a preferred embodiment of a planar light source device in accordance with the present invention.

Referring to FIG. 6, the planar light source device 3 comprises a light generation device 10; a light-mixing device 31 for mixing the light from the light generation device 10 to generate a mixed linear light; and a planar light generation device 32. The top portion of the planar light generation device 32 is composed of two inclined planes (tilting from the outside to the inside) and a light-scattering portion 33 for receiving the mixed light to generate a planar light. The shape of the bottom portion of the planar light generation device 32 is in the shape of a- arc surface. Besides, the planar light generation device 32 comprises a reflection layer in the bottom portion thereof for reflecting the light back to the planar light generation device 32 so as to improve the light-mixing efficiency. Furthermore, a reflection layer 331 can be formed on the light-scattering portion 33 to enhance the light-scattering efficiency.

Figure 7:
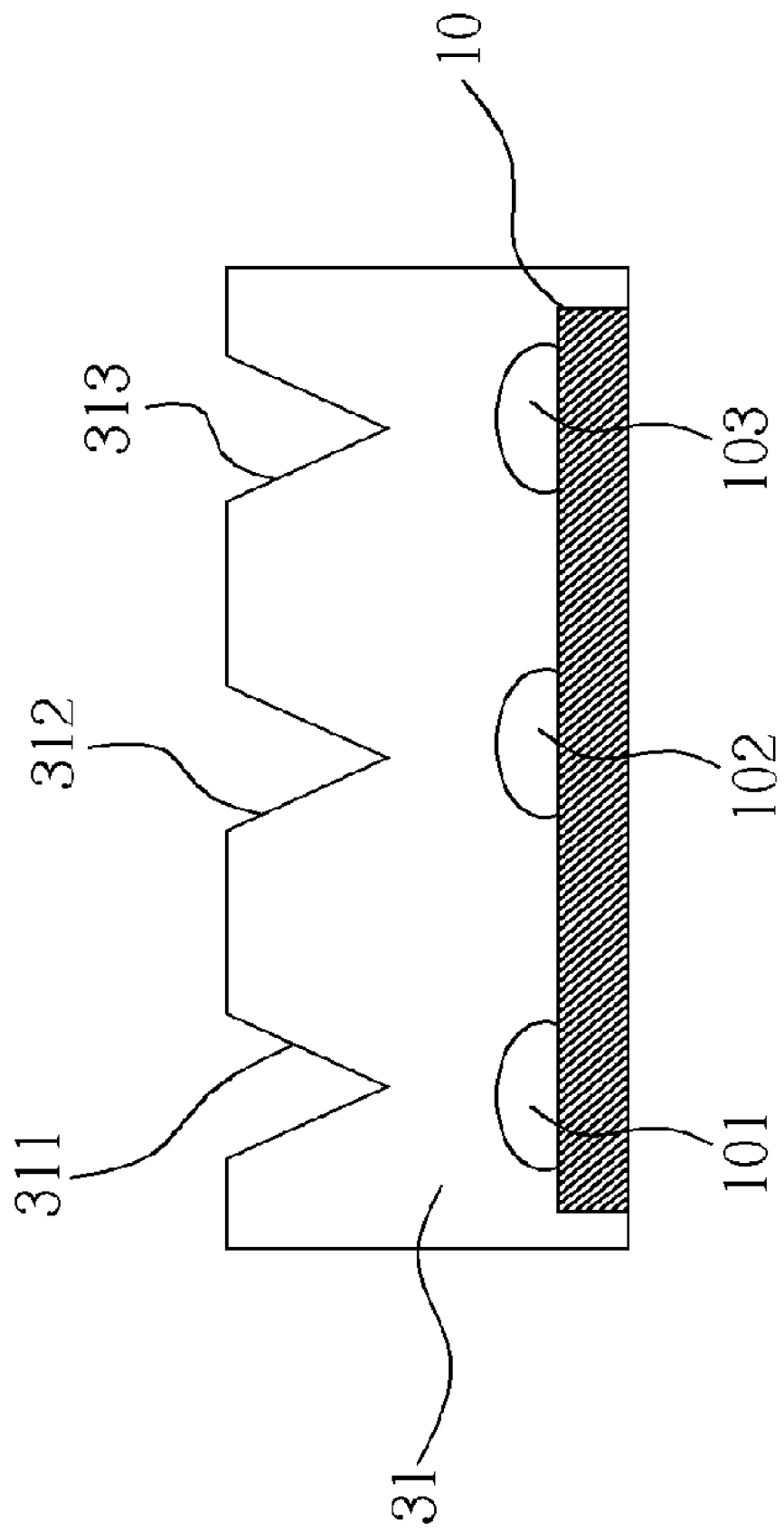
FIG. 7 is a cross-section view illustrating the light source device and the light-mixing device as shown in FIG. 6.

Referring to FIG. 7, the light generation device 10 can be embedded in the light-mixing device 31 to reduce the light dissipation as the light travels through air to the light-mixing device 31.

In order to increase the light-mixing efficiency, a reflection layer can be arranged around the light-mixing device of the above-mentioned embodiments for reflecting the light from the planar light generation device back to the light mixing device, so as to improve the light-mixing efficiency. Similarly, a reflection layer can be also formed at the bottom of the light generation device for guiding the light to the light-mixing device. The shape of the reflection layer can be a U-shape concave and can further improve the efficiency of the reflection layer.

In the forgoing embodiments, the light source device 10 can be of any light source type, including light-emitting diodes, fluorescent lights, incandescent lamps, or halogen bulbs. The light source device comprises at least two light-emitting elements or two light-emitting elements capable of generating light of different colors. The light generation devices can be arranged periodically or in groups for generating uniform light.

The reflection layer can be a metal layer, a mirror surface, or selected from other devices or can be processed by a surface treatment so as to be capable of reflecting light. The light-mixing device can be a material selected from a group consisting of acrylic resin, COC, PMMA, PC, polyetherimide, fluorocarbon polymer, silicone, and any other substitute materials. The planar light generation device and the light-mixing plate can use the similar material as the light-mixing device. A heat dissipation device can be arranged at the outside of the light generation device. As the planar light source device of the present invention is applicable to a large size LCD, it can combine a plurality of planar light source devices to form an array for use in the large size LCD.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A planar light source device, comprising:
   a light generation device comprising at least two light-emitting elements;
   a light-mixing device comprising a first light-scattering portion for mixing light from the light generation device to generate a mixed linear light; and
   a planar light generation device comprising a second light-scattering portion for receiving the mixed linear light for generating a planar light.

2. The planar light source device of claim 1, wherein the light generation device is a point light source.

3. The planar light source device of claim 1, wherein the light-mixing device comprises a plurality of first light-scattering portions.

4. The planar light source device of claim 3, wherein the amount of the first light-scattering portions is equal to the amount of light-emitting elements.

5. The planar light source device of claim 3, wherein each of the first light-scattering portions of the light-mixing device is a groove.

6. The planar light source device of claim 5, wherein the shape of the groove is selected from a group consisting of V shape, U shape, wavy shape, and other substitute shapes.

7. The planar light source device of claim 3, wherein each of the first light-scattering portions is in the form of a cone cavity.

8. The planar light source device of claim 1, wherein a lateral side of the light-mixing device is in the form of a printed distribution pattern.

9. The planar light source device of claim 1, wherein the second light-scattering portion is in the form of a groove.

10. The planar light source device of claim 9, wherein the shape of the groove is selected from a consisting of V shape, U shape, wavy shape, and other substitute shapes.

11. The planar light source device of claim 3, wherein those first light-scattering portions of the light-mixing device are orthogonal to the second light-scattering portion of the planar light generation device.

12. The planar light source device of claim 1, further comprising a reflection layer arranged around the planar light source device for limiting a light-traveling direction of the mixed light.

13. The planar light source device of claim 1, further comprising a reflection layer on the second light-scattering portion of the planar light generation device.

14. The planar light source device of claim 13, wherein the reflection layer is in the form of a metal layer, a mirror surface, or other devices or heat-treated surfaces capable of reflecting light.

15. The planar light source device of claim 1, wherein a reflection layer is formed around the light-mixing device.

16. The planar light source device of claim 15, wherein the reflection layer is a metal layer, a mirror planar, or other devices capable of reflecting light.

17. The planar light source device of claim 1, wherein the bottom of the planar-light generation device is in the form of an arc surface.

18. The planar light source device of claim 17, wherein the arc surface is a reflection surface.

19. The planar light source device of claim 18, wherein the reflection surface is in the form of a metal surface, a mirror surface, or other devices or heat-treated surfaces capable of reflecting light.

20. The planar light source device of claim 1, wherein two light-emitting elements of the light generation device generate the light in different colors.

21. The planar light source device of claim 1, the light generation device comprises a reflection surface.

22. The planar light source device of claim 21, wherein the reflection surface is in the form of a metal surface, a mirror surface, or other devices or heat-treated surfaces capable of reflecting light.

23. The planar light source device of claim 1, wherein the light generation device is embedded in the light-mixing device.

24. The planar light source device of claim 1, wherein the light-mixing device is made of at least one material selected from a group consisting of acrylic resin, COC, PMMA, PC, polyetherimide, fluorocarbon polymer, silicone, and other substitute materials.

25. The planar light source device of claim 1, wherein the planar light generation device is made of at least one material selected from a group consisting of acrylic resin, COC, PMMA, PC, polyetherimide, fluorocarbon polymer, silicone, and other substitute materials.

26. The planar light source device of claim 4, wherein the light-mixing device is made of at least one material selected from a group consisting of acrylic resin, COC, PMMA, PC, polyetherimide, fluorocarbon polymer, silicone, and other substitute materials.

* * * * *